United States Patent [19]

Rumbaugh et al.

[11] Patent Number: 5,005,119
[45] Date of Patent: Apr. 2, 1991

[54] USER INTERACTIVE CONTROL OF COMPUTER PROGRAMS AND CORRESPONDING VERSIONS OF INPUT/OUTPUT DATA FLOW

[75] Inventors: James E. Rumbaugh, Schenectady, N.Y.; Kenneth J. Daniel, North Ridgeville, Ohio

[73] Assignee: General Electric Company, Schenectady, N.Y.

[21] Appl. No.: 401,461

[22] Filed: Aug. 29, 1989

Related U.S. Application Data

[63] Continuation of Ser. No. 20,846, Mar. 2, 1987, abandoned.

[51] Int. Cl.$^5$ .................... G06F 15/00; G06F 3/14
[52] U.S. Cl. .................... 364/200; 364/232.22; 364/264; 364/286; 364/191
[58] Field of Search ... 364/200 MS File, 900 MS File, 364/300, 513, 191, 192, 419, 521

[56] References Cited

U.S. PATENT DOCUMENTS

| | | | |
|---|---|---|---|
| 4,315,315 | 2/1982 | Kossiakoff | 364/300 |
| 4,455,619 | 6/1984 | Masui et al. | 364/900 |
| 4,617,663 | 10/1986 | Lake et al. | 371/25.1 |
| 4,677,587 | 6/1987 | Zemany, Jr. | 364/900 |
| 4,713,656 | 12/1987 | Cliff et al. | 364/900 |
| 4,831,524 | 5/1989 | Furgerson | 364/300 |
| 4,831,580 | 5/1989 | Yamada | 364/900 |
| 4,866,663 | 9/1989 | Griffin | 364/900 |
| 4,872,167 | 10/1989 | Maezawa et al. | 364/200 |

OTHER PUBLICATIONS

"Coordinated Computing—Tools and Techniques for Distributed Software" by Filman et al., pp. 114-129, McGraw-Hill, Inc. 1984.
"Project Management for Engineers" by Rosenau, Jr., pp. 89-105, Van Nostrand Reinhold Company.
"Make-A Program for Maintaining Computer Programs" by Feldman, Ultrix-32 TM Supplementary Documents, vol. 11, Digital Equipment Corporation, 1984.
"An Introduction to the Source Code Control System" by Allman, Ultrix-32 TM Supplementary Documents, vol. 11, Digital Equipment Corporation, 1984.
"The Source Code Control System" by Rochkind, IEEE Trans. on Software Engineering, vol. SE-1, pp. 364-370, Dec. 1975.
"A Data Flow Multiprocessor" by Rumbaugh, IEEE Transactions on Computers, vol. C-26, No. 2, Feb. 1977.

*Primary Examiner*—Thomas C. Lee
*Attorney, Agent, or Firm*—John S. Beulick; James C. Davis, Jr.; Paul R. Webb, II

[57] ABSTRACT

A flowgraph system controls and tracks computer programs and data sets for a computer-aided design (CAD) task. The programs in the CAD task and their respective data set requirement are visually displayed as a flowgraph with which the user interacts to select input data sets and initiate program executions. The flowgraph provides the user with an indication of data flow and the progress of the CAD task.

22 Claims, 12 Drawing Sheets

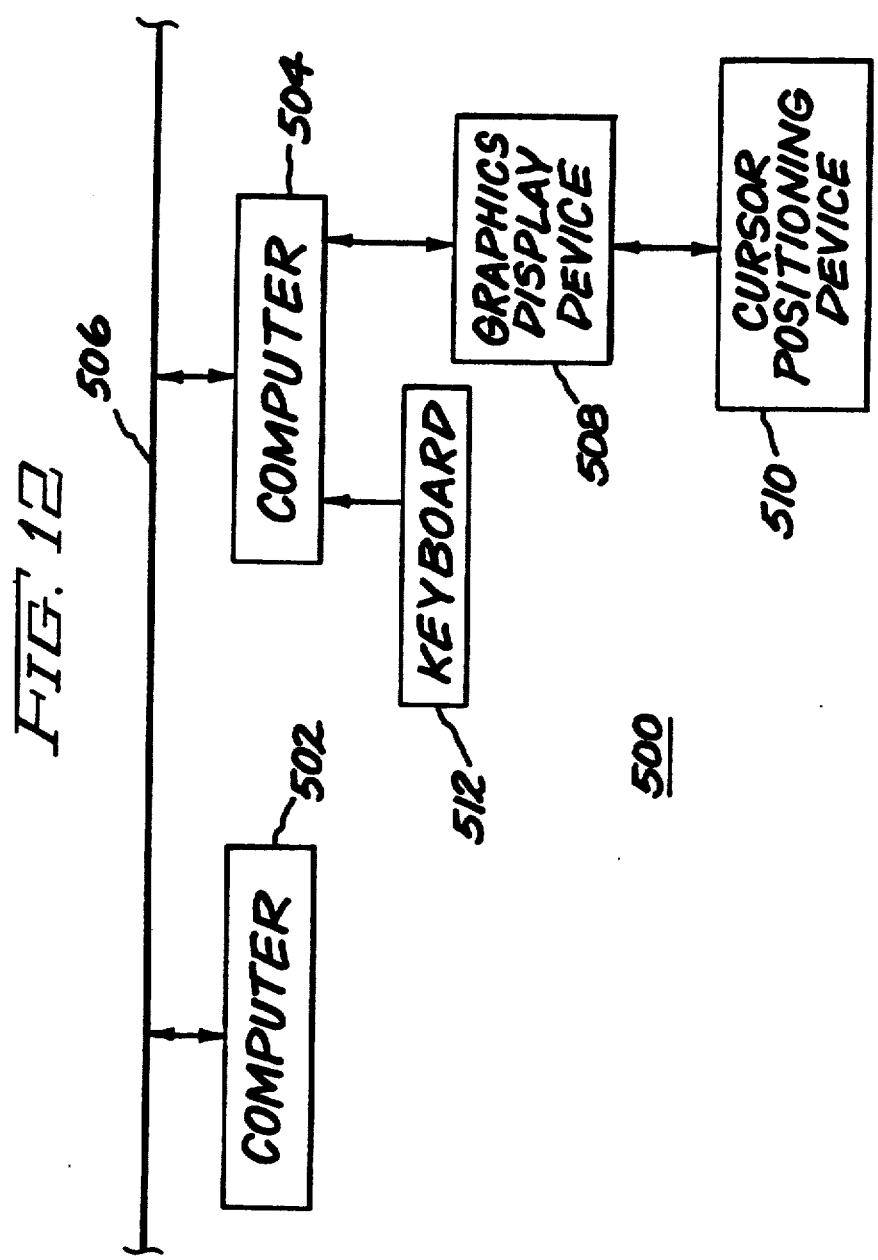

USER INTERACTIVE CONTROL OF COMPUTER PROGRAMS AND CORRESPONDING VERSIONS OF INPUT/OUTPUT DATA FLOW

This application is a continuation of application Ser. No. 020,846, filed Mar. 2, 1987, now abandoned.

This invention relates generally to computer data processing and, more specifically, to a method of organizing and controlling computer programs and data sets in a computer-aided engineering design environment.

BACKGROUND OF THE INVENTION

In a typical computer-aided engineering design environment, such as may be used to design an air foil for an airplane, the design progresses by means of the engineer processing specific data sets through a predetermined sequence of specific application computer programs. A large computer-aided engineering design environment may contain hundreds of programs, each program having its own command syntax and input requirements which the engineer must remember. Within the large computer-aided design environment, the engineer must also be knowledgeable as to which specific application programs are required to be run for a particular type of design and in what sequence those programs need to be run. There may well be cases where the output data sets of multiple programs are required as input to a single subsequent program in the sequence. The engineer must therefore keep track of input and output data sets respectively required or provided by each program. This entails creating input data files, making up unique file names, remembering the correct file name at appropriate times and keeping track of files containing program output data sets. The engineer must further remember how far the design has progressed, which data files are valid and a history of the actions which produce a final design result.

While the above described responsibilities imposed on the engineer are demanding, they are further compounded by the fact that in most engineering design environments, the design proceeds by performing multiple case studies. Thus, where there are several ways to solve a particular design problem, the engineer strives to optimize the design by varying different design parameters, each variation corresponding to a different version of the design. As a result of this versioning process, the engineer decides on a best version of his design but is also left with multiple uniquely identified data files corresponding to rejected versions. Further compounding this problem is the fact that the engineer may perform such versioning at different points along the design sequence, i.e. each version is not necessarily representative of the entire design but may only represent a subcomponent thereof. As a result, versioning complicates the problem of keeping track of files and also introduces the possibility of error that may result from mixing up data files associated with different versions.

The above-described problems encountered by the engineer in the computer-aided design environment can be additionally compounded where it is not possible to run all programs, required for a particular design, on the same computer. Thus, the effort required by the engineer to implement the computer-aided design process is substantial and serves to divert him from the primary goal of expeditiously completing the design.

Several different schemes for interfacing with computer programs are known in the art. The Apple MacIntosh personal computer interface is an example of an advanced interface. It has the capability of graphically depicting programs and data files as icons on the screen. In some cases, files are tagged with the name of the software that produced it. Consequently there is a connection between a data set and the program that produced it. However, it is assumed in this interface that a data set is associated with a single program. Consequently, this interface cannot be used for sequences of programs that pass data sets among them.

The Unix* "make" subsystem allows a programmer to represent the dependencies between a set of programs and organize them into an acyclic network. Although this program will automatically generate execution sequences compatible with the network, it does not maintain histories of data sets it creates and it does not provide a mechanism for generating and tracking multiple versions of a design.

Also known in the art is the Unix* Source Code Control System which allows a programmer to save and keep track of multiple versions of a single data set. This system does not provide a mechanism for generating the data set versions or tying the data set versions to the programs that generated them.
*A trademark of AT&T Bell Laboratories The Data Flow concept, known in the art, allows the representation of computer programs by a data flow network of operations and data sets. While this concept has been applied to the representation of algorithms within computers, it has not been applied to the management of diverse computer programs coded in different languages. Further, this concept does not address the problem of generating multiple versions of data sets at arbitrary points in the execution sequence.

It would therefore be desirable to provide the engineer with a tool or methodology to assist in his execution of the computer-aided design process. Such a tool would, desirably, automatically perform the tracking of design versions, file names of input and output data sets and the running of programs on one or more computers. Also, such a tool or methodology would preferably interact with the engineer in a user friendly fashion.

It is therefore a principal object of the present invention to provide a method and apparatus for controlling the processing of data sets by computer programs, such as may be encountered in a computer-aided design environment, which substantially removes the burden of manual tracking and operation normally required of a human user/engineer.

SUMMARY OF THE INVENTION

In accordance with the present invention, there is provided a method for controlling the execution of at least one computer program, such as may comprise a computer-aided design task, on a digital computer. The digital computer includes means for interacting with a human user and memory means for storing programs and data. The inventive method commences with identifying each computer program to be controlled and identifying for each such program an input and output data set requirement. The relationship amongst the programs and their respective input and output data set requirements is then defined. This, in turn, enables the next step of identifying for each program an input and an output data folder for respectively representing the input and output data set requirements for that program. Then, through user interaction, a user selected input data set is identified. At the next step, the presence of the selected input data set in the input data folder of a user selected program is verified. Upon completing such verification, computer commands are issued to initiate execution of the user selected program. The output data set generated by the user selected program is subsequently placed in the output data folder of that program.

In a preferred embodiment of the present invention, a flowgraph system is implemented in which the input and output data folders, computer programs and the defining relationships amongst them are visually displayed as a flowgraph. The user interacts with the displayed flowgraph, as with a cursor positioning device, to select input data sets and to initiate program executions. The flowgraph system also provides visual indication on the flowgraph of the progress and status of the computer-aided design.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

FIG. 12 is a diagrammatic illustration of a computer system in which the method of the present invention may be practiced.

DESCRIPTION OF THE INVENTION

The present invention comprises a system for controlling the processing of multiple computer programs in a computer-aided engineering design environment. The control system provides for identity of required input and output data sets for each computer program and a defined relationship between the programs, i.e. the sequence in which the programs must be executed. The system interfaces with a user/engineer in order to identify the source of an initial input data set and to separately initiate the running of each program in the sequence. By using the defined input data set requirements of each program, the control system assures that no program in the sequence can be executed until all input data sets required thereby are available. The system informs the engineer upon completion of each program execution and generally does not proceed to execute the next program in the sequence without initiation by the engineer. The system may, however, be configured to permit a program execution to be automatically initiated when its required input data sets are available. The system also assigns and tracks unique file names for all input and output data sets. In this manner, the engineer is relieved of the need to keep track of input and output files as this is done by the control system. The system is also adapted to track various design versions that are initiated by the engineer, in a manner more fully described below.

In a preferred embodiment of the present invention, the user interfaces with the control system through a graphical display device, such as a high resolution cathode ray tube. The control system provides a visual representation of the program sequence and program input/output data set requirements in the form of a flowgraph. The control system of the present invention implemented with the flowgraph representation is referred to hereinafter as the flowgraph system. The engineer is apprised by images on the flowgraph of the status of a current design, i.e. to what point the design task has progressed in the program sequence. Further, the engineer can interact with the flowgraph graphical display, e.g., by means of a cursor positioning device such as a mouse, to initiate program execution or create new design versions.

Figure 1:
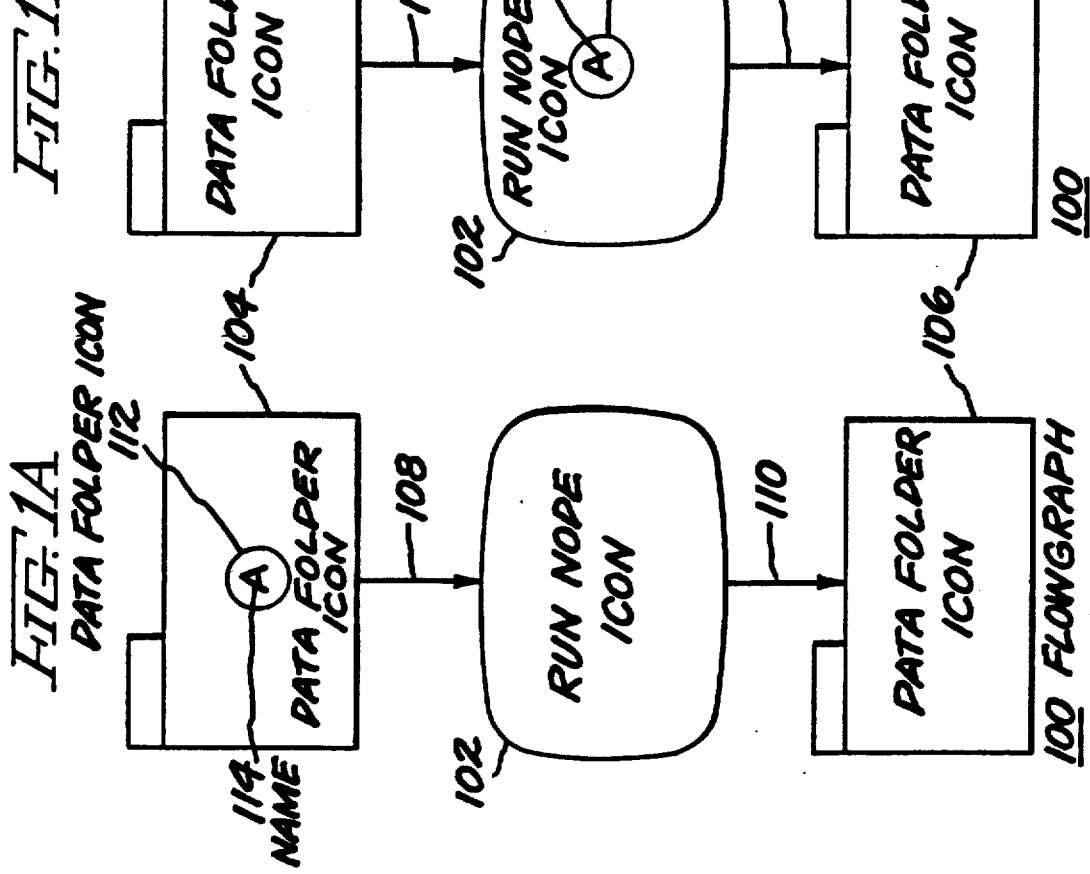
FIGS. 1a, 1b and 1c, illustrate exemplary flowgraphs as taught by the present invention.

All flowgraphs comprise different icons, designated run node icons and data folder icons, connected together by relational arrows. An exemplary flowgraph 100, as would appear on the display device, is illustrated in FIG. 1a. Flowgraph 100 comprises a run node icon 102 and data folder icons 104 and 106. The run node and data folder icons are interconnected by relational arrows 108, 110 to indicate the dependencies among the data folder and run node icons and thereby the logical progress of the computer-aided design process. Each run node icon represents a run node. Each computer program which is under the control of the flowgraph system is represented by a run node. Each data folder icon represents a data folder. Each distinct data set required as input by a program for execution is represented by an input data folder. Similarly, each distinct data set that would be generated as output upon execution of a program is represented by an output data folder. A data folder can at one time be an output data folder representing an output data set of one program and an input data folder representing an input data set required by a subsequent program in the flowgraph. Thus, a program may have associated therewith additional output data folders to represent identical copies of its generated output data set, where each such copy is required for execution of a different subsequent program in the flowgraph. It is noted that the data folders are best viewed as place holders enabling definition of input and output data set requirements of each program since, as is more fully described below, the data folders do not themselves store any data sets. Still referring to FIG. 1a, as indicated by arrow 108, icon 104 represents an input data folder for an input data set required for execution of the program represented by run node 102. Similarly, as indicated by arrow 110, icon 106 represents an output data folder for an output data set generated by the execution of the computer program represented by icon 102.

As stated above, a run node represents a computer program under the control of the flowgraph system. The program itself is not stored at the run node. Rather, each run node includes a sequence of computer commands effective to initiate execution of the program represented by the run node. Note that a run node may represent an interactive program, in which case the command sequence at the run node may include commands effective to open an interactive window adjacent the flowgraph on the display device. Note further that the run node may represent a program stored for execution in a computer different than the one in which the flowgraph system is being implemented. In such a case, the computer command sequence at the run node would be effective to initiate communication, over a connecting communication network, with the other computer effective to cause program execution. Additionally, the run node is not limited to representing a single program. The command sequence at the run node may be designed to initiate execution of multiple computer programs. Thus, the selection of a run node by user interaction with the flowgraph is effective to "execute" the run node, which includes initiating the sequence of computer commands at that run node. This of course assumes that the requisite input data sets defined for the run node are available.

The flowgraph system further comprises run tokens and data tokens which are used to carry the actual file names of data sets actually processed or intended for process by the computer programs represented on the flowgraph. Each token is represented on the flowgraph by a token icon. The presence of a data token within a data folder conceptually means that a particular data set having an actual file name carried by the data token is available at that data folder's position in the logical sequence of run nodes and data folders represented by the flowgraph. This is indicated on the flowgraph by a data token icon appearing on the data folder icon. In the case of an output data folder, a data token located therein would carry the file name of a data set generated by the program. In the case of an input data folder, a data token located therein would carry the file name of a particular data set available for input to the particular program for which the data folder represents an input data set requirement. A run token is associated with a particular execution of a run node and hence the program represented thereby. This is indicated on the flowgraph by a run token icon appearing on the run node icon. The run token carries the actual file name of each data set used as input in executing the program at the run node as well as the identity of the data token associated with each such data set. The run token further carries the identities of all output data tokens created as a result of that particular execution as well as the actual file names of the data sets generated by that execution. Run and data tokens also carry the identity of the particular design version with which they are respectively associated. Except for design version identity, the information carried by each run and data token is invisible to the engineer, the tracking of such details being performed by the flowgraph system rather than the engineer. Note however that, if required, all such information is readily retrievable by the engineer.

While all tokens are saved by the control system of the present invention, it is preferred that only the icons of active tokens be displayed on the flowgraph. An active token is one which represents the furthest progress of its respective design version. A used token is one which was previously active but became used when the design progressed beyond the point at which it was located. This is best understood by way of example. Referring again to FIG. 1a, an active data token icon 112 present on data folder 104 indicates that a particular data set represented thereby is available in the data folder for input to the computer program at run node 102. Data token icon 112 further includes an identifying name 114, e.g., "A", uniquely associating the token and the data set file name it carries with a particular version of the design. The user by means of interaction with the display can "select" run node 102 to thereby initiate execution of that run node and hence the program represented thereby. The control system of the present invention is adapted to issue the command sequence at the run node, and thereby initiate program execution, only if the input data set or sets required by the program are available. In FIG. 1A, the data set represented by token 112 is available at input data folder 104 and so the program at run node 102 can be executed. In the case of a flowgraph where there are multiple input data folders associated with a particular run node and active data tokens of multiple design versions present in those input data folders, the flowgraph system is adapted to verify that each input data folder contains the data set of the particular design version selected by the engineer for execution.

Upon issuing the command sequence at run node 102 to initiate execution of the program there, the flowgraph control system causes the flowgraph to appear as in FIG. 1B. There, a run token icon 116 that includes name 114 appears on the run node, to indicate that the computer program at run node 102 is currently being executed on the data set associated with the version indicated by name 114. Data token icon 112 no longer appears since the token it represented is now a used token. The run token represented by icon 116 is the active token associated with the design version identified by name 114. Upon completion of the program execution, the flowgraph control system generates the flowgraph appearing in FIG. 1C. The data set generated by the program at run node 102 is available at output data folder 106, this being indicated by the appearance of a data token icon 118 on that data folder. The version identifying name is retained on token icon 118 to indicate its association with that particular version of the design. Run token icon 116 disappears from the flowgraph upon completion of program execution, since the particular design version has progressed beyond that point and the run token represented by icon 116 is now a used token. The active token at this point is the data token represented by icon 118.

The cumulative design efforts for a particular design project, including various attempted design versions, effected by the engineer on the flowgraph system is referred to herein as a flowgraph instance. Thus, a particular flowgraph may have associated with it numerous flowgraph instances, each corresponding to a different design project. Each flowgraph instance has associated with it all active and used run and data tokens created during engineer interaction with that instance. Each flowgraph instance is assigned a name, preferably by the engineer, to enable easy retrieval of the instance Other aspects of a flowgraph instance are described in greater detail below.

It is noted that no data sets are actually stored in the flowgraph system. All input and output data sets reside in databases accessible by the flowgraph system. Except for input data sets whose actual file name identity in the database is provided by the engineer, e.g. an initial input data set, all other data sets are generated by computer programs under control of the flowgraph system. The above-described command sequence associated with a run node includes input and output data set file name parameters which must be replaced with actual data set file names. Each actual input data set file name is derived from the data token in each input data folder associated with the run node. The flowgraph system arbitrarily creates the actual file name to be assigned to each output data set generated by the program. The input and output file name parameters in the command sequence are replaced with the actual file names prior to issuance of the commands. Additionally, for documentation purposes, the actual input and output data set file names are stored in the run token created for the run node. Having been provided with the actual input and output data set file names in the command sequence, the program at the run node retrieves the appropriate input data set(s) from the database and directs its generated output data set(s), with the created file name(s), to the database. Further, upon completing program execution, each output data set file name is stored in each data token created as a result of the program execution and placed in an output data folder. Subsequently, should that output data folder serve as an input data folder to another run node, the data token therein would carry the actual input data set file name for execution of the other run node and the program represented by it. It is additionally noted that all input data sets to the flowgraph system are read only. The flowgraph system can in no way modify its input data. This enables concurrent use of data sets by different programs in the flowgraph system.

The flowgraph system enables the engineer to create a new design version at the input data folder(s) of any run node in the flowgraph selected by the engineer. Versioning is accomplished by creating a new data token, to be associated with the new version, for each input data folder of the selected run node. The data set file names contained in a data token associated with an existing version of the design, selected by the engineer, are copied into the new data token by the flowgraph system. The new token is represented on the flowgraph with an identifying name assigned by the user that will be carried through to all run and data tokens subsequently created as the new design version progresses. After creating the new version data token(s), the engineer interacts with the flowgraph system to provide or vary one or more design parameters which are inputs to a subsequent program, e.g. temperature, time, etc. in accordance with the new design version.

Figure 2:
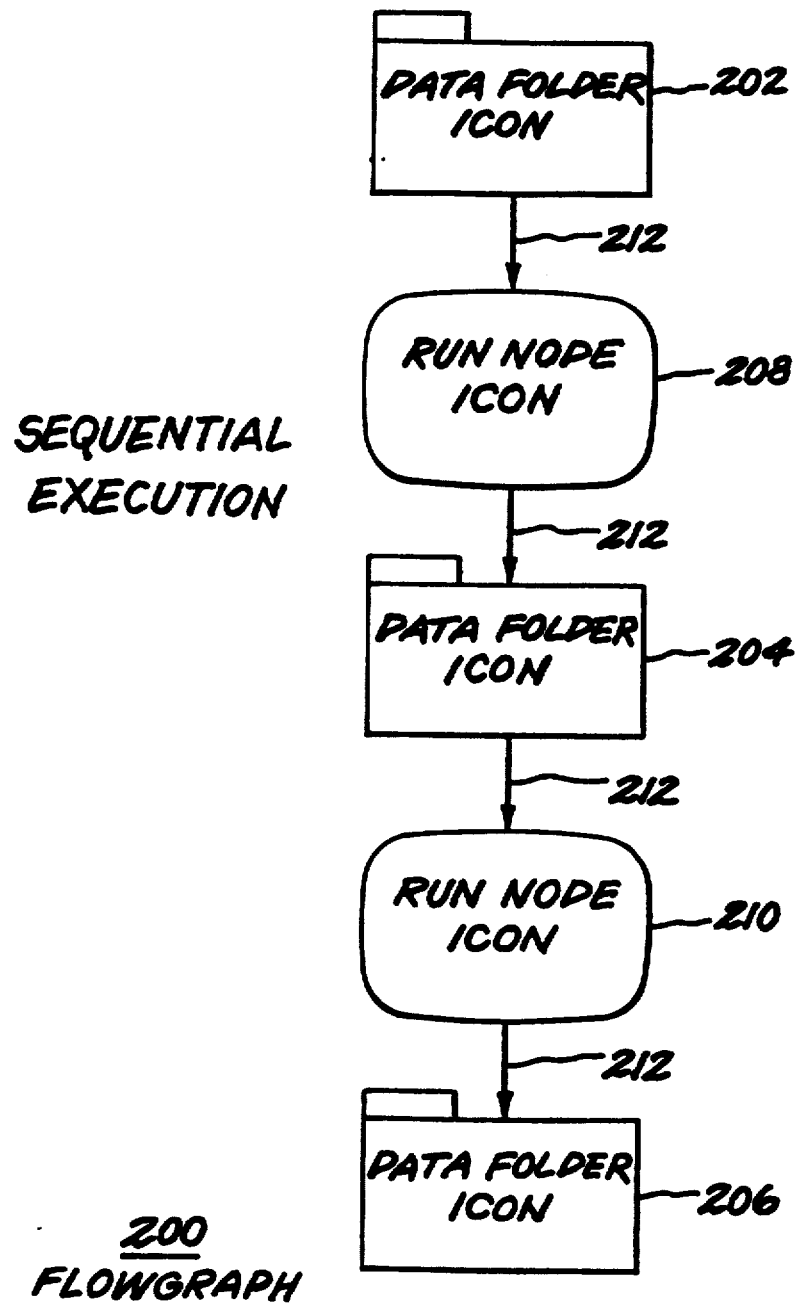
FIG. 2 illustrates an exemplary flowgraph for sequential execution of computer programs.

The adaptability of the flowgraph system to the control of complex computer-aided design tasks is discussed next. Any group of computer programs, each program having its own data set requirements, that comprises a computer-aided design task or portion thereof, can be represented by a flowgraph. The ability to so represent the programs is subject to the condition that no program may modify any of its input data sets. Any group of computer programs that can be represented, can be controlled by the flowgraph system. FIGS. 2-5 illustrate exemplary flowgraph configurations representative of the logical interrelationships between computer programs typically occurring in computer-aided design FIG. 2 illustrates a flowgraph 200 representing a sequence of data folder icons 202, 204, 206 and run node icons 208, 210 interconnected by relational arrows 212. As in FIGS. 1A, 1B and 1C, relational arrows 212 show the flow of data through the flowgraph system and the logical progression of the computer-aided design process. It will be appreciated that when the computer programs represented by the run node icons are executed in sequence, the output data folder for a first executed program, represented by run node icon 208, is also the input data folder for a second executed program, represented by run node icon 210. Note that a single active token icon on flowgraph 200 is sufficient to indicate the progress of a particular design version.

Figure 3:
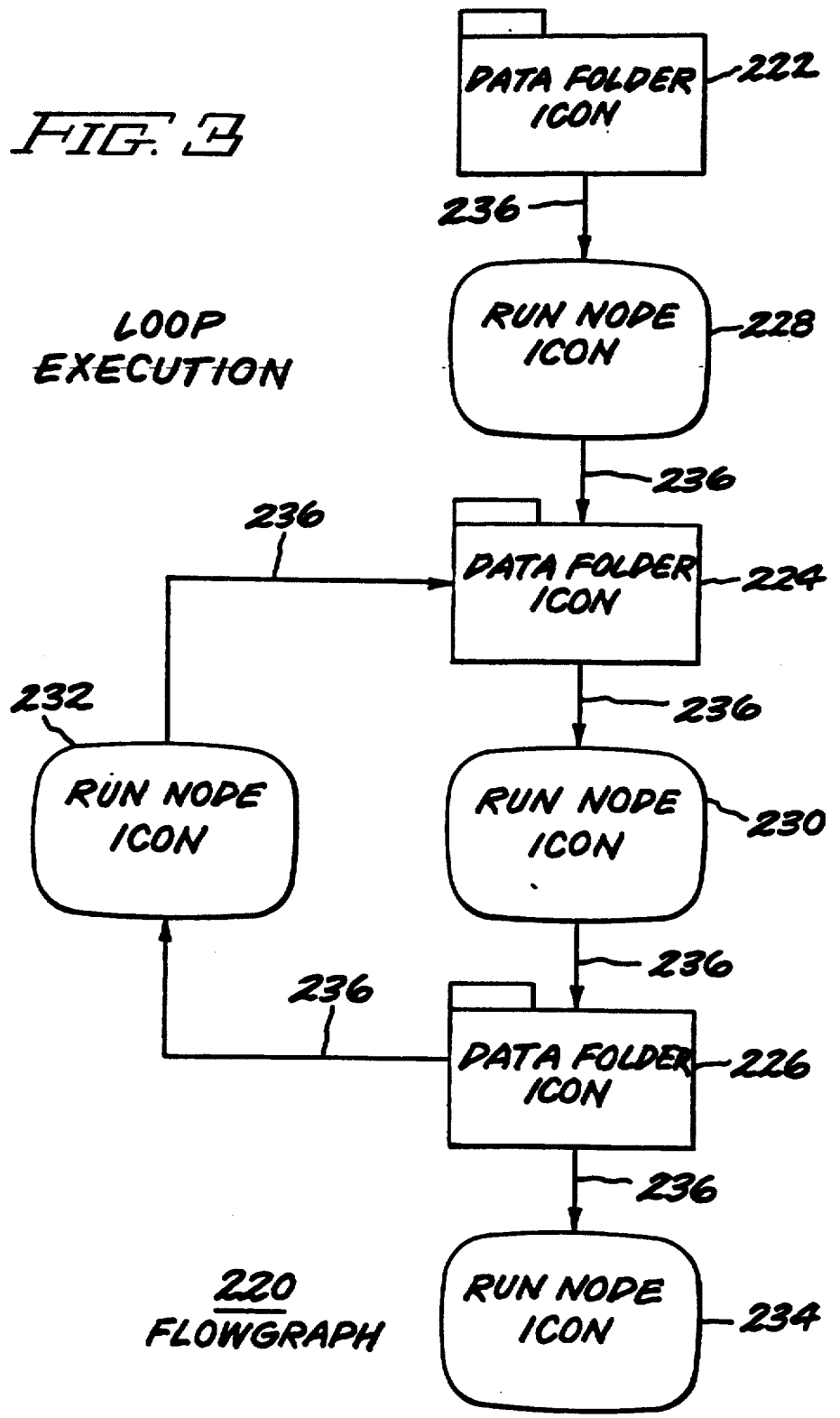
FIG. 3 illustrates an exemplary flowgraph for looped execution of computer programs.

FIG. 3 illustrates a flowgraph 220 comprising data folder icons 222, 224, 226 and run node icons 228, 230, 232, 234 interconnected by relational arrows 236. Flowgraph 220 represents a loop execution. The output data set generated by the program represented by run node 230, and available in the data folder represented by icon 226, is available as the input data set for the program represented by run node icon 232. Further, following an initial execution of the program represented by run node icon 232, the output data set generated thereby is also the input data set for the program at icon 230. While the output data set at data folder icon 226 is also the input data set for the program at icon 234, the engineer is free to repeat the loop through the programs at icons 230 and 232 before proceeding to the execution of the program at icon 234. Again, a single active token is sufficient to indicate progress of a particular design version.

Figure 4:
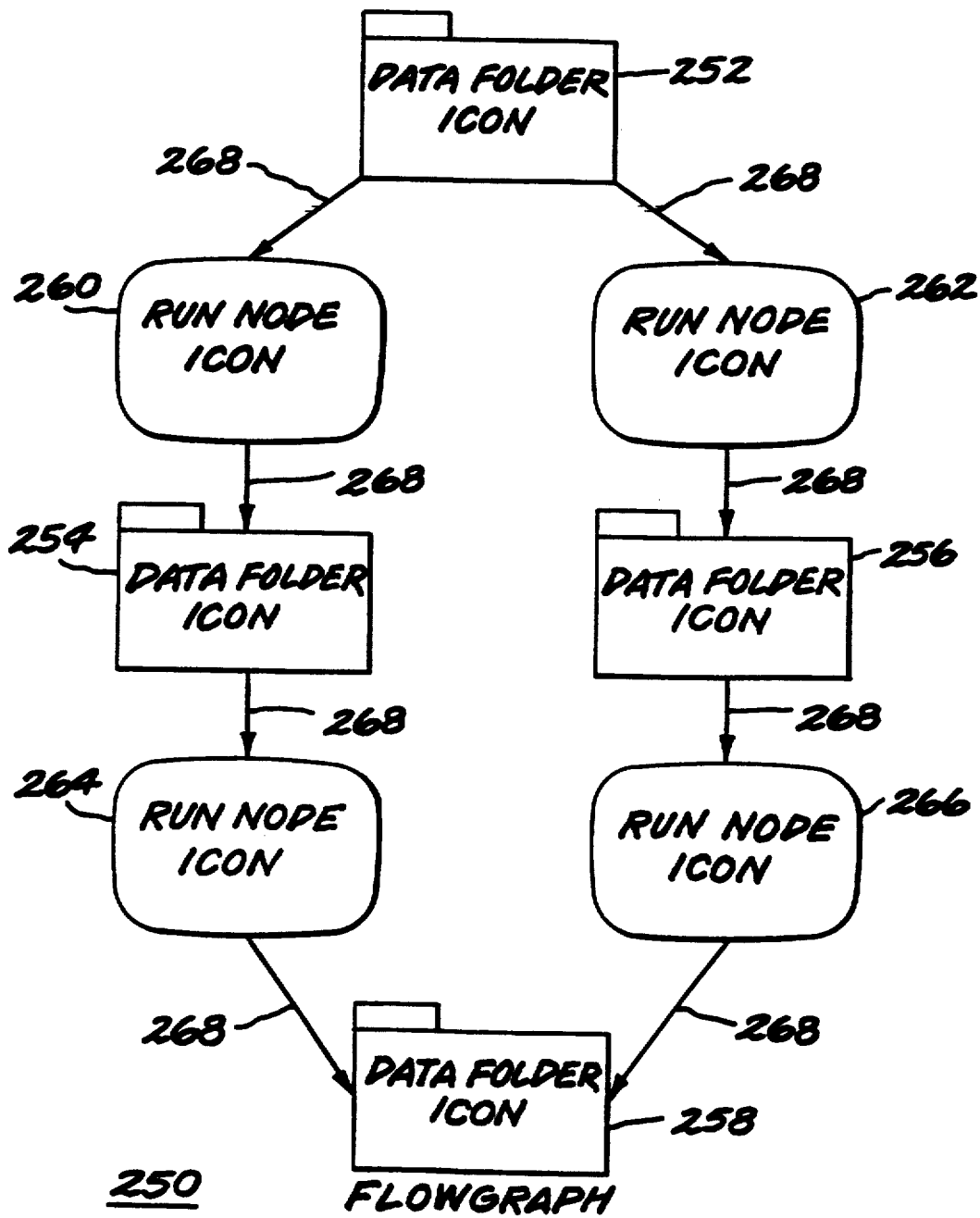
FIG. 4 illustrates an exemplary flowgraph for conditional execution of computer programs.

FIG. 4 illustrates a flowgraph 250 representing the case of conditional or branched program execution and consists of data folder icons 252, 254, 256, 258 and run node icons 260, 262, 264, 266 interconnected by relational arrows 268. A data set in the data folder represented by icon 252 can be used as input to execute the program at either of the two run node icons 260 or 262. Either the program sequence through icons 260 and 264 or through icons 262 and 266 may be followed. In the case of flowgraph 250, it is impermissible to execute both program sequences to generate a single output data set for the data folder represented by icon 258. Again a single active token can indicate design progress.

Figure 5:
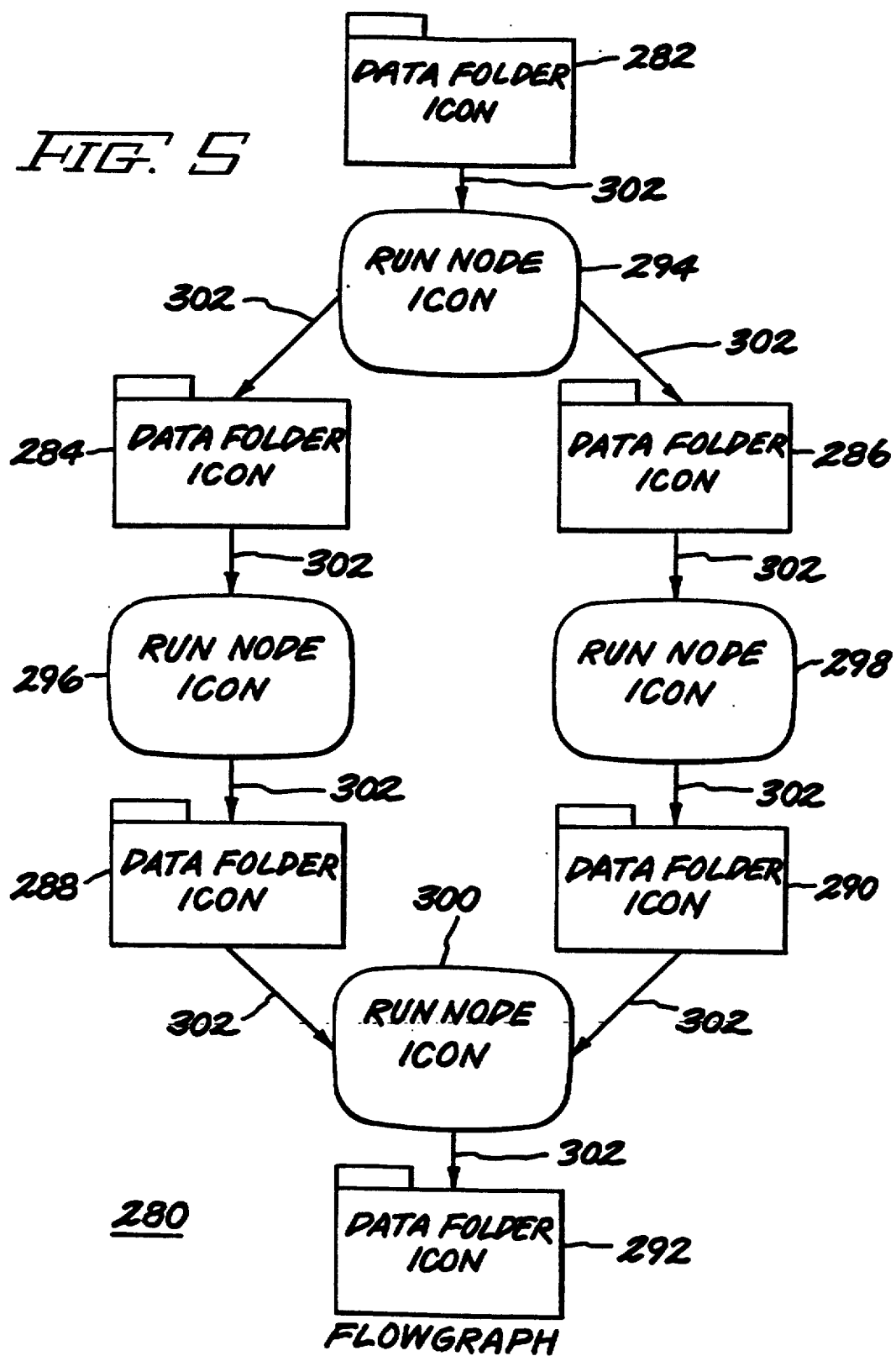
FIG. 5 illustrates an exemplary flowgraph for concurrent execution of computer programs.

FIG. 5 illustrates a flowgraph 280 representing the case of concurrent program executions. Flowgraph 280 consists of data folder icons 282, 284, 286, 288, 290, 292 and run node icons 294, 296, 298, 300 interconnected by relational arrows 302. The program represented by run node icon 294 generates two distinct output data sets respectively directed into the data folders represented by icons 284 and 286. Thereafter, the programs at run node icons 296 and 298 may independently execute on the data set placed in its respective input data folder. The program at run node icon 300 cannot be executed until the output data sets generated by both programs at run node icons 296 and 298 are available in its respective input data folders, represented by icons 288 and 290. The progress of the design represented by flowgraph 280 cannot always be indicated by a single token icon. Since concurrent program execution is a possibility, two icons may at times be required to indicate design progress.

Flowgraphs having configurations other than illustrated in FIGS. 2-5 may be constructed. Further, flowgraphs may be constructed to include more than one of the configurations illustrated in those figures. An additional flexibility afforded by the flowgraph system is the ability to nest flowgraphs. Nesting is accomplished by constructing a flowgraph so that one of its run nodes is actually another flowgraph.

Figure 6:
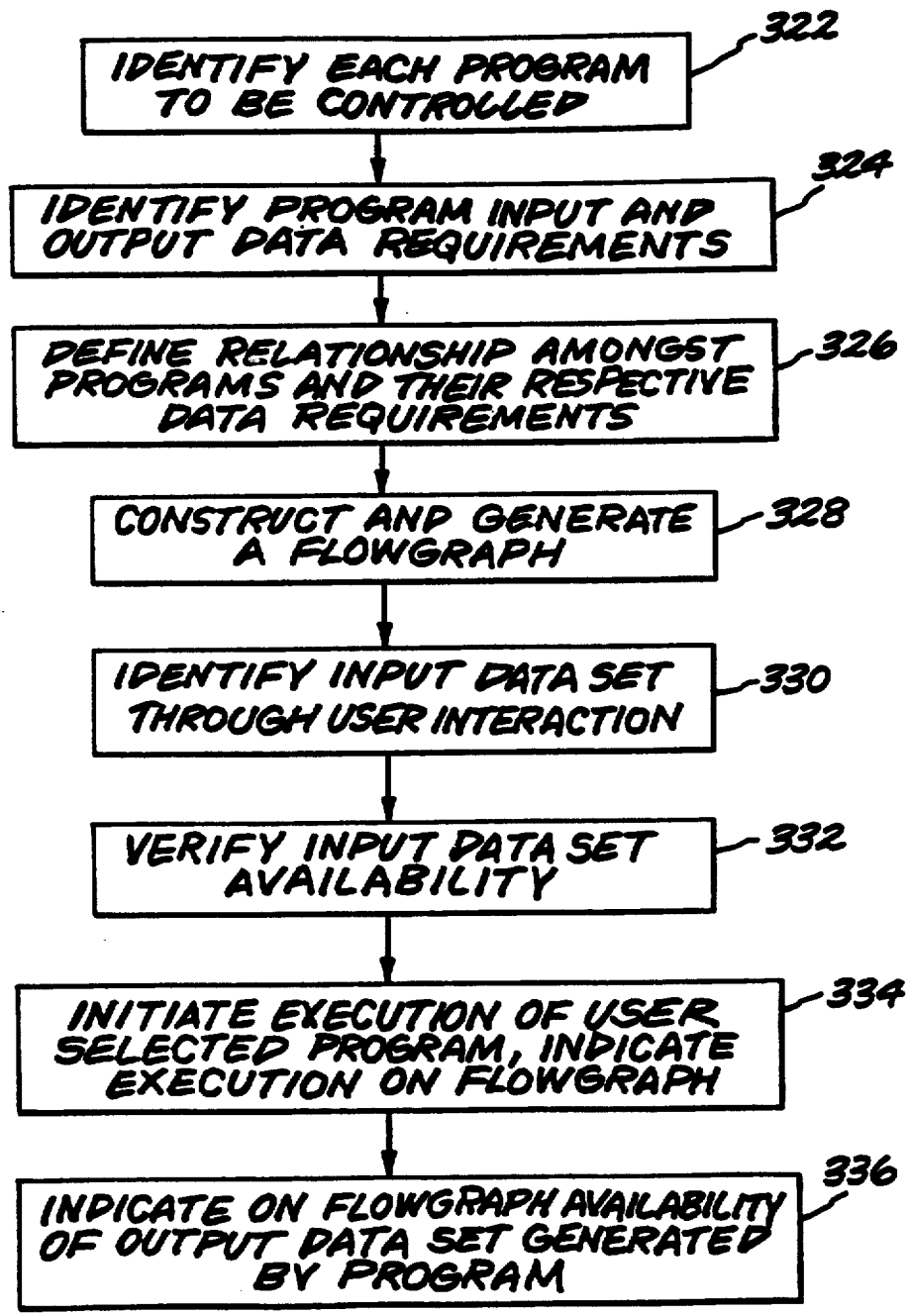
FIG. 6 is a flowchart representation of the method of the present invention as practiced with a preferred embodiment thereof.

Referring now to FIG. 6, a block diagram 320 is shown which illustrates an overview of the inventive control method. The method commences at step 322 with the identification of the computer programs to be controlled by the control system of the present invention. These would be the computer programs associated with a particular computer-aided design task. Next, at step 324, the number of unique data sets required as input for each program and the number of unique data sets generated as output thereby are identified. At step 326, the relationship amongst the identified programs and their respective data requirements is defined. Such relationships include those where the output data sets of one program are the required input data sets of another program. The defined relationships enable the construction of a flowgraph, such as illustrated in FIGS. 1-5, representative of the programs comprising the computer TM aided design task to be controlled. Thus at step 328, the flowgraph is constructed and generated on a display device to enable user interaction with the control system.

With the flowgraph so displayed, it is next necessary for the engineer to identify the input data set(s) to be used (step 330) in a subsequent program execution. Where the program to be executed is an initial program in a sequence represented on the flowgraph, it may be necessary for the user to provide the file name of each input data set required by the program. Where there is more than one input data folder associated with the program to be executed, the control system verifies (step 332) that each such input data folder holds a data token corresponding to a design version selected by the user. Once the control system completes verification at step 332, it initiates execution of the computer program (step 334). As described above, the system accomplishes this by issuing the computer commands associated with the run node representative of the program. The fact that program execution has commenced is indicated by displaying a run token icon on the run node icon of the program. Upon completion of program execution, the system, at step 336, indicates the availability of the data set generated by the program by displaying a data token of the particular design version on each output data folder icon of the run node.

It will be appreciated by those skilled in the art that there are a number of different ways in which to structure the programming which implements the control system of the present invention. The flowgraph system preferred herein has been reduced to practice and the programming created to implement that system is described next. The flowgraph control system programming draws upon three major data structures, to wit, a flowgraph action description, a flowgraph display description and a token database.

As discussed above, a flowgraph is structured to represent a group of computer programs corresponding to a set of computer-aided design tasks. A flowgraph action description for the flowgraph representing those computer-aided tasks includes a name assigned to the flowgraph and full descriptions of each data folder, each run node and the input/output relationship between data folders and run nodes. Further, the flowgraph action description includes a unique name assigned to each data folder and run node so they can be separately identified. Chart 1 summarizes the content of the flowgraph action description:

CHART 1

Flowgraph Action Description

Flowgraph name

List of data folder names corresponding to the data set input or output requirements of the programs in the flowgraph Set of run node descriptions, one for each program to be executed in the flowgraph; each run node description includes:

run node name list of input data folder names list of output data folder names list of computer commands including commands to execute programs, with input and output data set file name parameters appearing in the text of the computer commands It is apparent from Chart 1 that the previously described characteristics attributable to each data folder and run node are included in the flowgraph action description.

The flowgraph display description is a graphical description of the flowgraph. The flowgraph display description includes the graphical attributes of data folder icons, run node icons, relational arrows and tokens. Names for the run node and data folder icons, which correspond to the names assigned in the flowgraph action description, are included in the display description. The arrows between the icons must correspond to the input/output relationships specified in the flowgraph action description. The correspondence between the flowgraph action and display descriptions is solely by means of icon names. This simplifies generation of the flowgraph display and enables the display to be created using a general purpose picture editor software package. The visual representation of the flowgraph is provided solely as a convenience to the user and to simplify user interaction. Data and run token icons are displayed in a manner more fully described below. Chart 2 summarizes the content of the flowgraph display description:

CHART 2

Flowgraph Display Description

For each input or output data folder of any program, a data folder icon with a name corresponding to the name of a data folder in the Flowgraph Action Description For each run node, a run node icon with a name corresponding to the name of a run node in the Flowgraph Action Description For each input and output dependency a relational arrow extending between the appropriate data folder icon and run node icon A description of the graphical attributes needed to display a run node icon, a data folder icon, a relational arrow, a run token and a data token As described above, a flowgraph instance corresponds to a particular design project effected with a flowgraph. Since each flowgraph instance has a unique name, it is easily retrievable by the engineer. Each flowgraph in the flowgraph system also has a name. Each flowgraph instance name corresponds to a unique flowgraph name. However, each flowgraph name may correspond to many flowgraph instance names. The engineer is thereby enabled to access a particular flowgraph instance directly by its name or through a listing of flowgraph instance names associated with a particular flowgraph name. Each flowgraph instance includes a list of its run and data tokens, both used and active, as well as the name of its unique flowgraph. The tokens are maintained in a token database containing the information for each token as described above, e.g. data set file name, design version name, etc. The tokens in the token database are accessible to each flowgraph instance. The information constituting each flowgraph instance is summarized in Chart 3 below:

CHART 3

Flowgraph Instance

Name of the Flowgraph Instance
Name of the corresponding flowgraph
Set of data and run tokens
Each run token in the token database includes
    name of run node with which token
    is associated
    version name
    file name of each actual input and output data set
    status of token (either "used" or "active")
Each data token in the token database includes
    name of data folder with which token is associated
    version name
    file name of each data set represented by token
    identity of run token associated with the run node
        execution which generated the data token
    status of token (either "used" or "active")

Figure 7:
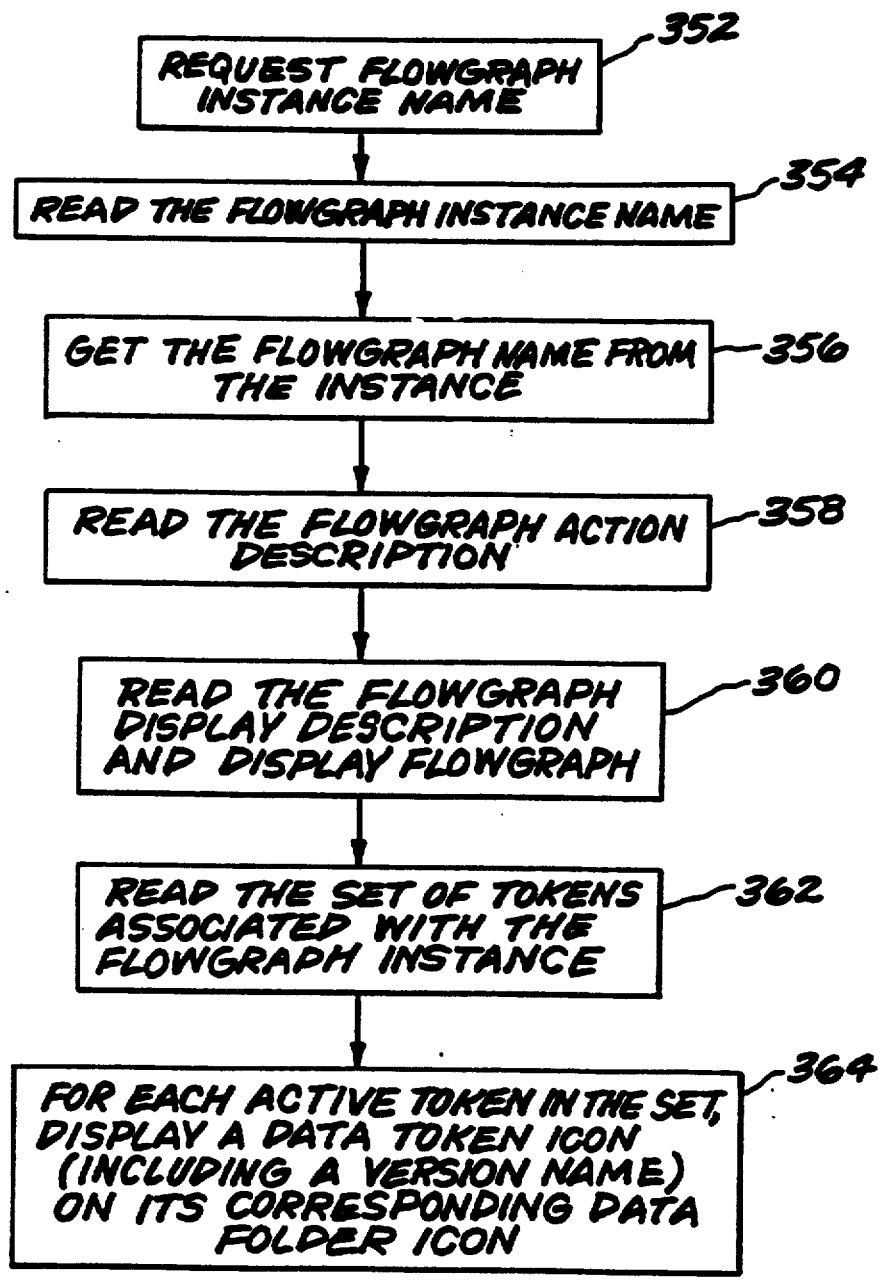
FIGS. 7 is a flow chart representation of the steps executed by the flowgraph system program to generate a graphical display of a flowgraph instance.

The structure of the flowgraph system program that interacts with the user to execute a flowgraph is described next. FIG. 7 contains a flowchart 350 of the steps executed by the flowgraph system (FS) program in order to generate a graphical display of a flowgraph instance. It is assumed that the flowgraph action description and flowgraph display description for the particular flowgraph being controlled are already contained in the flowgraph system. At step 352, the FS program requests a user input of a flowgraph instance name. The flowgraph instance name input is read at step 354 and, at step 356, the FS program gets the name of the corresponding flowgraph from the flowgraph instance. As stated above, the engineer may instead provide a flowgraph name and select an instance name from a displayed list of instances associated with the flowgraph.

The flowgraph name includes pointers to the action and display descriptions of the flowgraph. Thus at steps 358 and 360, the FS program reads the flowgraph action and display descriptions. As previously discussed, each flowgraph instance has one or more data and run tokens, both used and active associated therewith, such as by pointers. These tokens are therefore readily accessible to the FS program and at step 362, the tokens associated with the flowgraph instance are read. As a result of reading the tokens, the FS program determines which data tokens are active and at step 364 causes display of the active data tokens on their respective data folder icons.

Steps 352 through 360 are, as described above, effective to identify the programs to be controlled, their associated input and output data folders and to enable construction and display of the flowgraph. These steps are substantially identical, in their effect, to steps 322 through 328 in FIG. 6. As a result, the method outlined in FIG. 6 is descriptive of both the case of initially forming a flowgraph and the case of recalling a flowgraph instance. In the latter case, the method of FIG. 6 would then continue at step 330 with the user identifying an input data set by selecting a data token icon, as described above. The remaining steps 332 through 336 are obviously of equal applicability to the flowgraph instance case.

Figure 8:
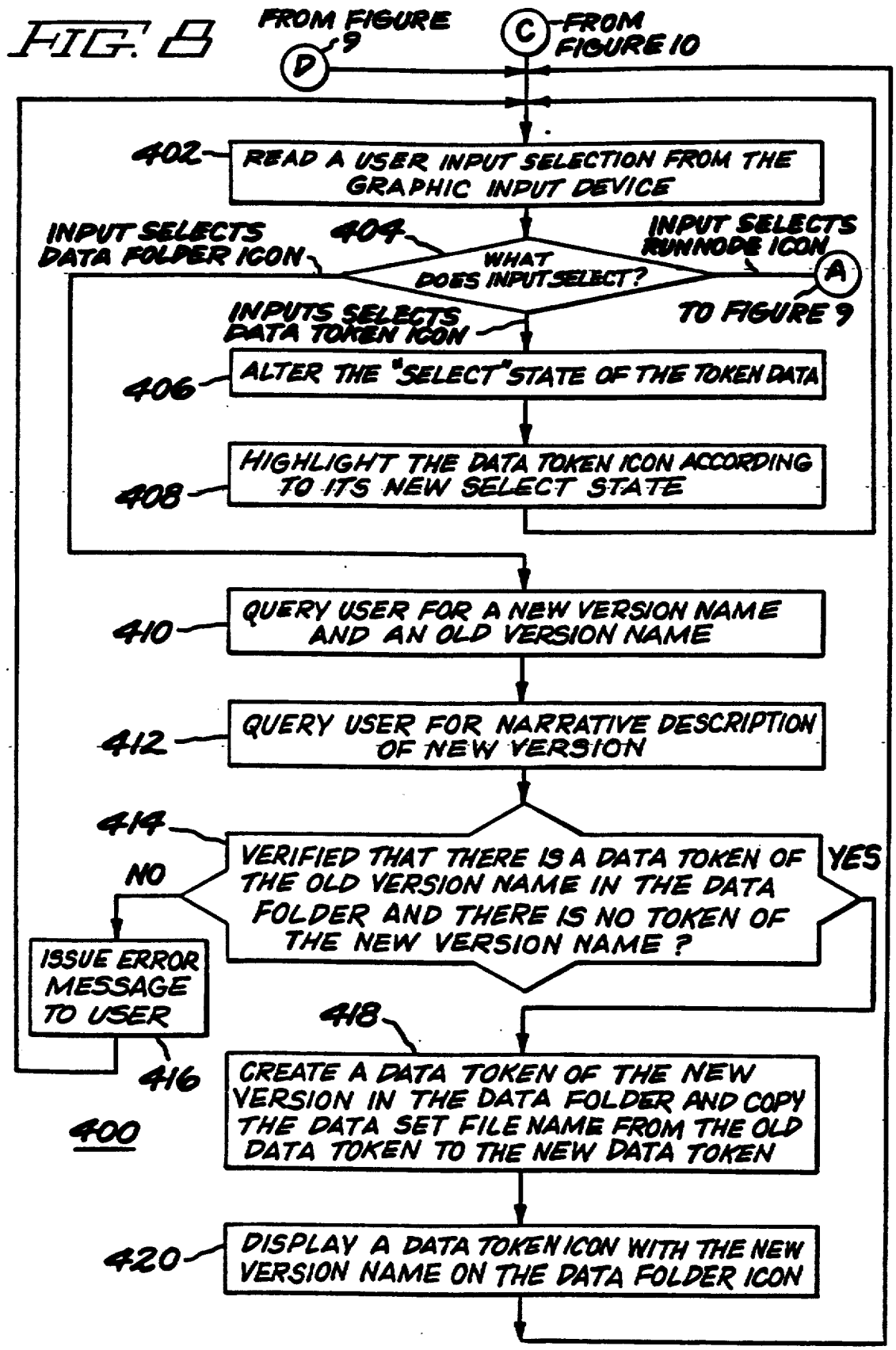
FIG. 8 is a flow chart representation of the steps executed by the flowgraph system program in response to the different possible user inputs.

Upon completion of step 364 (FIG. 7), the flowgraph instance is displayed and is ready to receive a user input in order to proceed with the computer-aided design task. A flowchart 400, commencing in FIG. 8, shows the steps executed by the FS program in response to the different possible user inputs. Flowchart 400 commences with a step 402 in which the FS program reads the user "selection" of one of the icons on the display, via the cursor positioning device. The user may "select" a data token icon, a data folder icon or a run node icon. At step 404, the nature of the user input is determined. If the user selects a data token icon, this indicates the user is selecting a data set, represented by the token, for use in a program execution to be subsequently initiated by the user. The FS program proceeds to step 406 in which it internally alters a "select" state, e.g. by setting or clearing a flag, of the data token corresponding to the user selected icon. With respect to the select state a data token is either in the select state or it is not. At step 408, the FS program acknowledges the user selection by highlighting the icon of the selected data token such as by changing its color. The FS program then returns to step 402 to read the next user selection.

If the user selects a data folder icon, this is an indication that the user wishes to create a new design version. The FS program therefore queries the user, at step 410, for both a new version name and the name of an old version from which the data set file names are to be copied in order to create the new version. At step 412, the user is further queried for a brief narrative description of the new version. This narrative description is associated with the new version and stored for later reference by the user as a reminder of the new version's significance or purpose. At step 414, the FS program verifies that there is a data token of the old version in the selected data folder and that there is no data token of the new version in that data folder. If either of these conditions is not verified then an error message is issued to the user in step 416. Following step 416, the FS program returns to step 402 to read another user selection. If both conditions are verified, the FS program proceeds to step 418 in which it creates an active data token, in the token data base, for the new version and associates that token with the selected data folder. Additionally, the FS program copies the data set file name from the identified old version data token into the new version data token just created. Then at step 420, the FS program causes display of a data token icon, with the new version name, on the selected data folder. The FS program then returns to step 402 to read the next user selection.

Figure 9:
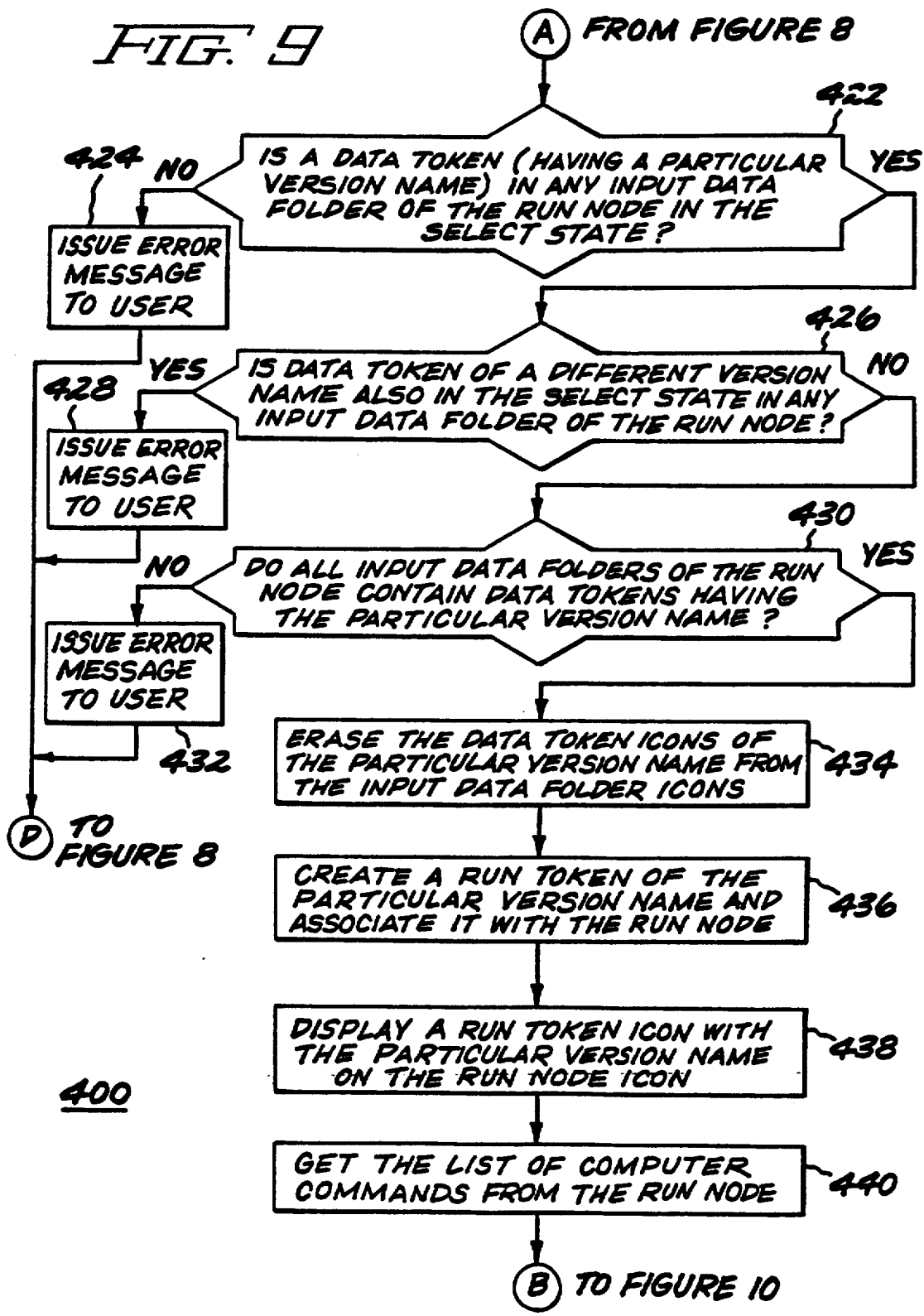
FIG. 9 is a continuation of the flowchart in FIG. 8.

Flowchart 400 is continued in FIG. 9, in reference to which, if the user selects a run node icon, this is an indication that the user wishes to execute that run node and the program represented thereby. The FS program proceeds to step 422 where it determines if an active data token in any input data folder to the run node is in the "select" state, i.e. such as would have been accomplished by the user selection of an input data token. If there are no active data tokens in the select state, the FS program issues an error message to the user (step 424). If there is a data token in the select state, then step 426 is executed in which it is determined whether there is another select state data token of a different design version in any of the input data folders of the selected run node. If there is such a data token, the FS program issues a user error message (step 428). However, if there is no such other select state token of a different design version, the FS program proceeds to step 430 in which it determines if each input data folder of the selected run node contains a data token of the same design version as the data token in the select state. If each input data folder does not contain such a token, a user error message is issued, at step 432. If, however, a data token of the same design version as the select state data token is contained in each input data folder, the FS program proceeds to step 434. Note that following error message issuance at steps 424, 428 or 432, the program returns to step 402 to read the next user selection.

At step 434, the FS program causes the data token icons, having the same version name as the select state data token and on the input data folder icons of the selected run node, to be erased from the display. Then, at step 436, the FS program creates a run token, in the token database, to carry information related to the impending program execution. The FS program includes in the newly created active run token, the design version name of the select state data token and the name of the selected run node. At step 438, the FS program causes generation of a run token icon, including the appropriate design version name, to be displayed on the selected run node icon. Next, the FS program gets the computer commands associated with the run node (step 440), those commands being included in the run node description in the flowgraph action description.

Figure 10:
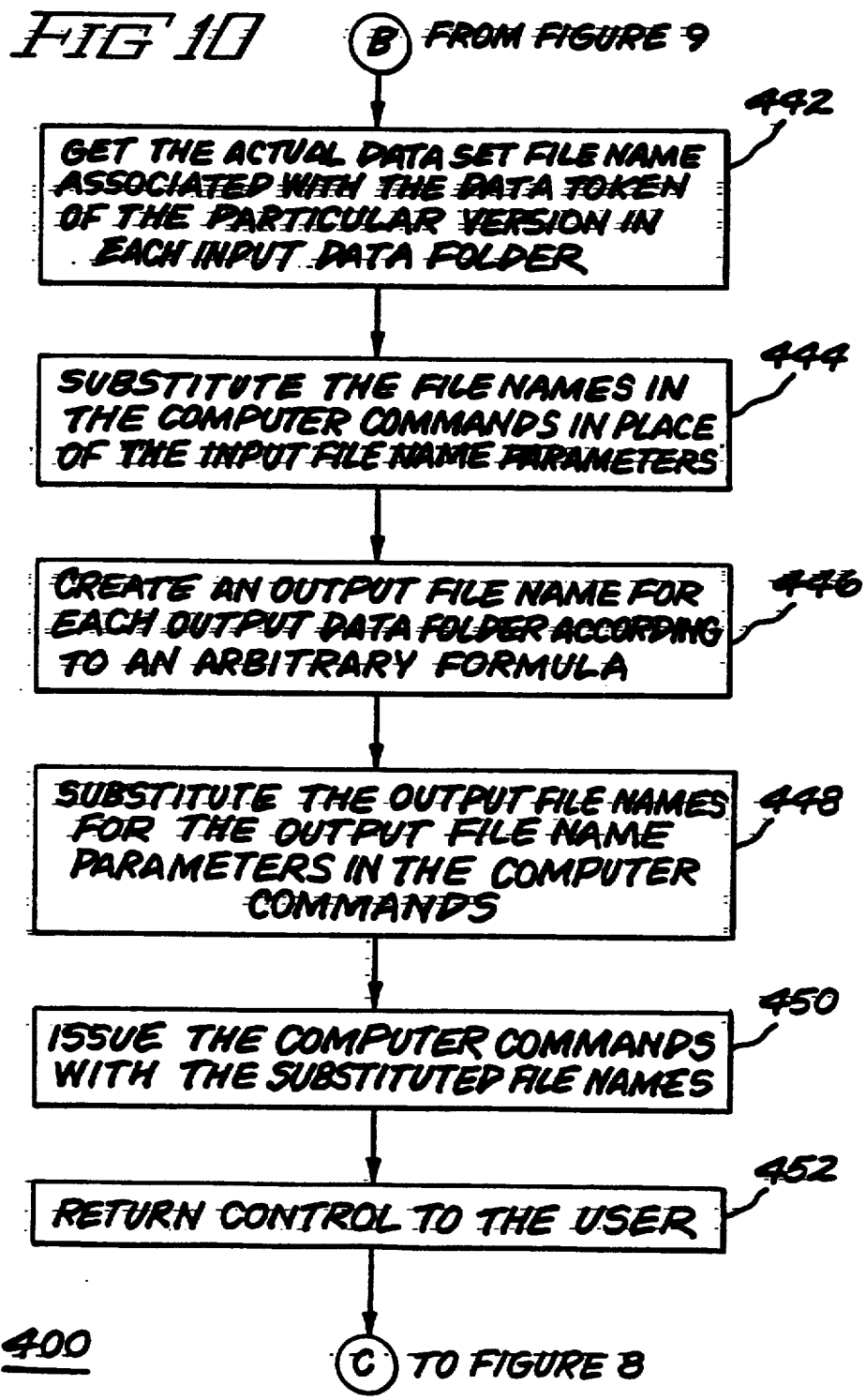
FIG. 10 is a continuation of the flowchart in FIG. 9.

Flowchart 400 is continued on FIG. 10, in reference to which, at step 442, the FS program gets the actual data set file name associated with each input data token of the appropriate design version Then, at step 444, the actual file names are substituted for the input file name parameters in the computer commands. The FS program then creates, at step 446, an output file name for each data set to be generated by execution of the program at the run node. Each such output file name is substituted for a corresponding output file name parameter in the computer commands (step 448). Finally, at step 450, the FS program issues the computer commands so that execution of the program at the run node is initiated. Control of the flowgraph control system is returned to the user at step 452 and the FS program is ready to read a user input selection (step 402).

Figure 11:
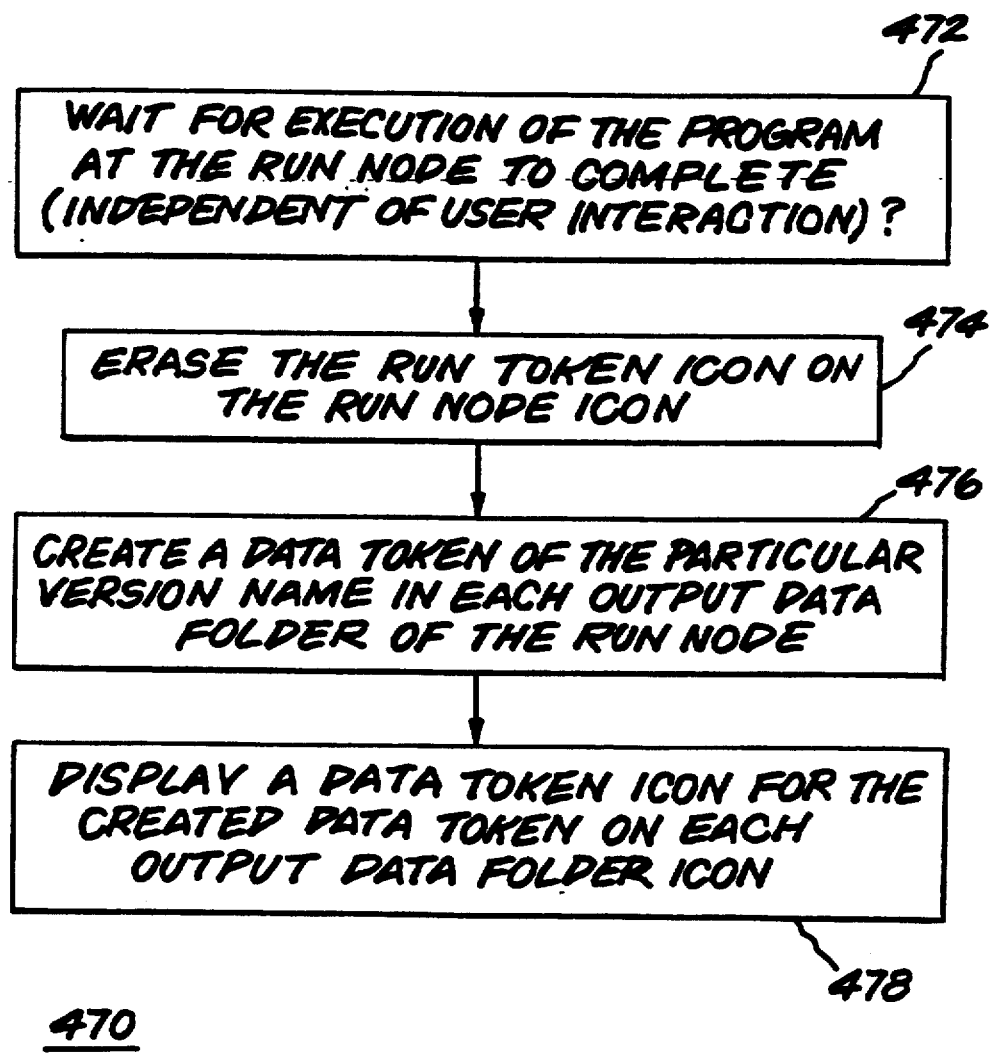
FIG. 11 is a flow chart representation of the steps executed by the flowgraph system program independently of user interaction.

Independently of user interaction, the FS program performs additional steps upon completion of execution of the program at the run node, as illustrated in a flowchart 470 shown in FIG. 11. At step 472, the FS program checks whether execution of the program at the run node is complete and when it is, step 474 is performed in which the FS program causes the run token icon to be erased from the run node icon on the display. Then at step 476, the FS program creates an active data token, in the token database, for each output data folder of the run node. Each such data token carries the appropriate design version name as well as the previously determined (FIG. 10, step 446) output file name for the data set associated therewith. The FS program then proceeds to step 478 where a data token icon having the appropriate design version name and representative of one of the newly created data tokens, is displayed on each output data folder icon of the run node. User interaction is not blocked by execution of the steps in flowchart 470. Note that programs at several run nodes of the flowgraph system may be in execution concurrently and that the FS program performs the flowchart 470 steps for each such program.

FIG. 12 illustrates an exemplary computer system 500 in which the control system of the present invention may be practiced. System 500 includes two digital computers 502 and 504 respectively connected to a communication network 506 so that the two computers may communicate with one another. Computers 502 and 504 may each be provided as a Digital Equipment Corporation VAX 780 computer or a Sun 3/75 computer.

Computer 504, on which the flowgraph control system of the present invention is to be implemented, has connected thereto a graphics display device 508, such as a high resolution cathode ray tube. A cursor positioning device 510, such as a mouse, is provided to enable user interaction with computer 504 through display device 508. A keyboard 512 is also connected to computer 504 to enable text input thereto by the user.

In operation, the flowgraph system program and data structures associated therewith, i.e. flowgraph action and display descriptions, flowgraph instances and token database, are implemented on computer 504. As a result, a flowgraph or an instance thereof, for a particular computer-aided design task, may be displayed on display device 508. The user interacts with the flowgraph display in the manner described above, by means of device 510 and keyboard 512, in order to control the particular design task. Programs that comprise the design task under control of the flowgraph control system may be located in computer 502 and/or computer 504. Where such a program is located in computer 502, the computer commands at the run node representative of such a program include appropriate commands to enable communication over network 506 to initiate program execution at computer 502 and to subsequently receive a communicated indication of program execution completion.

While a preferred embodiment of the present invention has been described hereinabove as including a flowgraph graphical display to facilitate user interaction, the invention is not so limited. The control system of the present invention may be practiced without the display of a flowgraph. In such a case, the engineer would interact with the control system via text inputs and responses through the computer on which the system is implemented. Each computer-aided design task would still be represented within the inventive control system using the flowgraph format, i.e. including data folders, run nodes and tokens. All that would be lacking would be the visual display of the flowgraph to the user. The control system would still track data set file names and control program executions as described hereinabove. The engineer would be provided with indications of the status of the design tasks by text responses generated by the inventive control system.

The control system of the present invention, as described hereinabove, provides for input and output data set requirements for each computer program under system control. There may, however, be situations where a program, upon execution, generates its own input data or where a program generates no output data, i.e. a data source or sink. In these situations it is referred herein that the flowgraph including such programs still have input and output data folders for such programs. Where there is no actual input or output data set requirement, the input data identification and availability verification steps of the inventive method (FIG. 6, steps 330 and 332) would be mere formalities. However, the presence of a token in such a data source or sink would respectively indicate the intent of the user to subsequently initiate a program execution or the completion of a program execution. Note that provision of all input and output data folders serves to provide connecting element to other elements in the flowgraph.

While the storage of data sets as provided hereinabove has been described in terms of file storage in a conventional file system, the invention is not so limited. It is also possible to store a data set within a conventional data base management system such that the file name is replaced by an attribute on each element of the data set, i.e. "data set name", within the data base sufficient to uniquely identify the data set. Each data token would carry the appropriate data set name, the data set names being created by the FS program in a manner analogous to its creation of file names.

Computer system 500, illustrated and described herein, on which the control system of the present invention may be implemented includes two computers. The inventive control system may, however, be successfully practiced with a single computer or in a computer system with many computers. Where only a single computer is available, the control system is implemented on that computer as are the design programs under its control. In the case of a multiple computer system, the inventive control system is implemented on a single computer but is enabled to control execution of programs on any other computer in the computer system connected to a common communication network. As stated above, the commands at each run node in the flowgraph would include the appropriate information to initiate such communication.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A method of for tracking program execution and versions on a digital computer during a computeraided engineering design operation, said computer including means for interacting with a human user and memory means for storing programs and data, said method comprising the steps of:
    a) identifying on the digital computer each program to be controlled;
    b) identifying for each said program input and output data set requirements;
    c) defining a relationship amongst said programs and their respective input and output data set requirements;
    d) identifying an input data folder and an output data folder for respectively representing said input and output data set requirements for each said program;
    e) identifying through user interaction each said user selected input data set;
    f) verifying the presence of each said user selected input data set in each said input data folder of each said user selected program;
    g) issuing computer commands effective to execute each said user selected program on each said user selected input data set, each said user selected program generating an output data set upon completing execution;
    h) placing each said output data set generated by each said user selected program into said output data folder thereof; and
    i) automatically identifying for each said output data set a respective input data set which was utilized to generate said output data set, thereby tracking design versions resulting from said computeraided engineering design operation.

2. The method of claim 1 wherein said input and output data sets are stored in a database in which each said data set is identified by a unique file name, said method comprising the additional steps of:
    defining a data token to represent each said input and output data set, each said data token including the file name of the data set represented thereby; and
    defining a run token to represent each execution of each said user selected program, each said run token including the file name of the user selected input data set on which said user selected program is executed.

3. The method of claim 1, further comprising the steps of:
    assigning to each said input data set an input data set design version name;
    assigning to each said output data set an output data set design version name; and
    said verifying step further comprising the substep of verifying the presence, in each said input data folder of said user selected program, of an input data set having the same input data set version name as said user selected input data set.

4. The method of claim 3 wherein the output data set version name of each said output data set generated by execution of said user selected program is the same as the input data set version name of the input data set on which said user selected program is executed.

5. The method of claim 1, further comprising the steps of:
    generating on a display device a visual flow graph representation of each said data folder and each said program and said defined relationship therebetween; and
    providing an indication on said display device of whether execution of each said user selected program has begun or is complete.

6. The method of claim 5, said indication providing step comprising the substeps of:
    providing an indication on said display device, prior to step (g), of the presence of said user selected input data set in each said input data folder of each said user selected program;
    providing an indication on said display device, upon the occurrence of step (g), that said user selected program is being executed on said user selected input data set; and
    providing an indication on said display device, upon the occurrence of step (h), that said output data set generated by each said user selected program is present in each said output data folder of each said user selected program.

7. The method of claim 1, said method comprising the additional step of generating on a display device a visual flow graph representation o each said data folder and each said program and said defined relationship therebetween, said visual representation generating step comprising the substeps of:
- displaying a run node icon representative of each said program;
- displaying an input and an output data folder icon respectively representative of each said input and output data folder; and
- relating said run node and data folder icons in accordance with said defined relationship between said programs and said data folders.

8. The method of claim 7 comprising the further step of generating a visual indication on said display device of whether execution of each said user selected program has begun or is complete, said visual indication generating step comprising the substeps of:
- displaying, prior to execution of each said user selected program, a first data token icon on each said input data folder icon in which said user selected input data set is present;
- displaying, during execution of each said user selected program, a run token icon on the run node icon representative of said user selected program; and
- displaying, following execution of each said user selected program, a second data token on each said output data folder icon in which said output data set is present.

9. The method of claim 8 comprising the additional steps of:
- assigning to each said input data set an input data set design version name;
- assigning to each said output data set an output data set design version name;
- displaying on said first and second data tokens symbols respectively representing said input and output version names; and
- said verifying step further comprising the substep of verifying the presence in each said input data folder of said user selected program of an input data set having the same input data set version name as said user selected input data set.

10. Apparatus for tracking program execution and versions on a digital computer during a computeraided engineering design operation, said computer including means for interacting with a human user and memory means for storing programs and data, said apparatus comprising:
- means for identifying on the digital computer each program to be controlled;
- means for identifying on the digital computer for each said program input and output data set requirements;
- means for defining on the digital computer a relationship amongst said programs and their respective input and output data set requirements;
- means for identifying on the digital computer an input data folder and an output data folder for respectively representing said input and output data set requirements for each said program;
- means for identifying on the digital computer through user interaction each said user selected input data set;
- means for verifying on the digital computer the presence of each said user selected input data set in each said input data folder of each said user selected program;
- means for issuing on the digital computer computer commands effective to execute each said user selected program on each said user selected input data set, each said user selected program generating an output data set upon completing execution;
- means for placing on the digital computer each said output data set generated by each said user selected program into the output data folder thereof; and
- means for automatically identifying on the digital computer for each said output data set a respective input data set which was utilized to generate said output data set, thereby tracking design versions resulting from said computeraided engineering design operation.

11. The apparatus of claim 10 wherein said input and output data sets are stored in a database in which each said data set is identified by a unique file name, said apparatus further comprising:
- means for defining on the digital computer a data token to represent each said input and output data set, each said data token including the file name of the data set represented thereby; and
- means for defining on the digital computer a run token to represent each execution of each said user selected program, each said run token including the file name of the user selected input data set on which said user selected program is executed.

12. The apparatus of claim 10 further comprising:
- means for assigning on the digital computer to each said input data set an input data set design version name;
- means for assigning on the digital computer to each said output data set on output data set design version name; and
- said verifying means further comprising means for verifying on the digital computer the presence, in each said input data folder of said user selected program, of an input data set having the same input data set version name as said user selected input data set.

13. The apparatus of claim 12 wherein the output data set version name of each said output data set generated by execution of said user selected program is the same as the input data set version name of the input data set on which said user selected program is executed.

14. The apparatus of claim 10 and further comprising:
- means for generating on a display device coupled to the digital computer a visual flowgraph representation of each said data folder and each said program and said defined relationship therebetween; and
- means for providing an indication on said display device of whether execution of each said user selected program has begun or is complete.

15. The method of claim 14, said indication providing means comprising:
- means for providing, prior to execution of said user selected program, an indication on said display device of the presence of said user selected input data set in said input data folder of each said user selected program;
- means for providing an indication on said display device that each said user selected program is being executed on said user selected input data set; and
- means for providing, upon completion of execution of said user selected program, an indication on said display device that said output data set generated by each said user selected program is present in said output data folder of each said user selected program.

16. The apparatus of claim 10 further including means for generating on a display device coupled to the digital computer a visual flowgraph representation of each said data folder and each said program and said defined relationship therebetween, said visual representation generating means comprising:
- means for displaying a run node icon representative of each said program;
- means for displaying an input and an output data folder icon respectively representative of each said input and output data folder; and
- means for relating said run node and data folder icons in accordance with said defined relationship between said programs and said data folders.

17. The apparatus of claim 16 further comprising means for generating a visual indication on said display device of each whether execution of said user selected program has begun or is complete, said visual indication generating means including:
- means for displaying, prior to execution of each said user selected program, a first data token icon on each said input data folder icon in which said user selected input data set is present;
- means for displaying, during execution of each said user selected program, a run token icon on the run node icon representative of said user selected program; and
- means for displaying, following execution of each said user selected program, a second data token icon on each said output data folder icon in which said output data set is present.

18. The apparatus of claim 17 further comprising:
- means for assigning to each said input data set an input data set design version name;
- means for assigning to each said output data set an output data set design version name;
- said verifying means further comprising means for verifying the presence in each said input data folder of said user selected program of an input data set having the same input data set version name as said user selected input data set.

19. A computer system for tracking program execution and versions on a digital computer during a computeraided engineering design operating, said system comprising:
- means for a user to interact with said computer; memory means for storing programs and data; said digital computer programmed to:
  a) identify on a digital computer each program to be controlled;
  b) identify input and output data set requirements for each said program to be controlled;
  c) define a relationship amongst said programs and their respective input and output data set requirements;
  d) identify an input data folder and an output data folder for respectively representing said input and output data set requirements for each said program;
  e) identify through user interaction each said selected input data set;
  f) verify the presence of each said user selected input data set in each said input data folder of each said user selected program;
  g) issue computer commands effective to execute each said user selected program on said user selected input data set, each said user selected program generating an output data set upon completing execution;
  h) place said output data set generated by each said user selected program into said output data folder thereof; and
  i) automatically identify for each said output data set a respective input data set
  which was utilized to generate said output data set, thereby tracking design versions resulting from said computeraided engineering design operation.

20. The computer system of claim 19 wherein said input and output data sets are stored in a database in which each said data set is identified by a unique file name, said digital computer further programmed to:
- define a data token to represent each said input and output data set, each said data token including the file name of the data set represented thereby; and
- define a run token to represent each execution of each said user selected program, each said run token including the file name of the user selected input data set on which said user selected program is executed.

21. The computer system of claim 19 further comprising a graphical display device;
said digital computer further programmed to:
- generate on said display device a visual flow graph representation of each said program and said defined relationship therebetween; and
- provide an indication on said display device of whether execution of each said user selected program has begun or is complete.

22. The computer system of claim 19 further comprising a graphical display device;
said digital computer further programmed to:
- display a run node icon representative of each said program;
- display an input and an output data folder icon respectively representative of each said input and output data folder;
- relate said run node and data folder icons in accordance with said defined relationship between said programs and said data folders;
- display, prior to execution of said user selected program, a first data token icon on each said input data folder icon in which said user selected input data set is present;
- display, during execution of said user selected program, a run token icon on the run node icon representative of said user selected program; and
- display, following execution of said user selected program, a second data token on each said output data folder icon in which said output data set is present.

* * * * *